(12) United States Patent
Kim et al.

(10) Patent No.: US 10,601,115 B2
(45) Date of Patent: *Mar. 24, 2020

(54) MOBILE TERMINAL

(71) Applicant: LG ELECTRONICS INC., Seoul (KR)

(72) Inventors: Minseok Kim, Seoul (KR); Hansu Kim, Seoul (KR); Kangjae Jung, Seoul (KR); Youngbae Kwon, Seoul (KR); Sungjung Rho, Seoul (KR); Changwon Yun, Seoul (KR); Kyoungwon Jeon, Seoul (KR); Duckyun Kim, Seoul (KR); Hyoungwook Lim, Seoul (KR); Yunmo Kang, Seoul (KR); Hayong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,647

(22) Filed: Mar. 18, 2019

(65) Prior Publication Data

US 2019/0214707 A1    Jul. 11, 2019

Related U.S. Application Data

(63) Continuation of application No. 15/244,963, filed on Aug. 23, 2016, now Pat. No. 10,256,527.

(30) Foreign Application Priority Data

Jan. 11, 2016  (KR) .................. 10-2016-0003385
Jan. 12, 2016  (KR) .................. 10-2016-0003901

(51) Int. Cl.
*H01Q 1/24* (2006.01)
*H01Q 21/28* (2006.01)
(Continued)

(52) U.S. Cl.
CPC ............. *H01Q 1/243* (2013.01); *H01Q 1/38* (2013.01); *H01Q 7/00* (2013.01); *H01Q 9/42* (2013.01);
(Continued)

(58) Field of Classification Search
CPC .......... H01Q 1/243; H01Q 7/00; H01Q 9/045; H01Q 9/42; H01Q 21/28
See application file for complete search history.

(56) References Cited

U.S. PATENT DOCUMENTS 9,318,793 B2    4/2016  Zhu et al.
10,256,527 B2*  4/2019  Kim ...................... H01Q 9/42
(Continued)

FOREIGN PATENT DOCUMENTS

EP    1258944 A2    11/2002
EP    2629361 A2    8/2013
(Continued)

*Primary Examiner* — Robert Karacsony
(74) *Attorney, Agent, or Firm* — Birch, Stewart, Kolasch & Birch, L.L.P.

(57) ABSTRACT

A mobile terminal includes a window including a transparent region and an opaque region surrounding the transparent region, a metal case provided below the window to accommodate the window, having a rear surface portion facing the window and a side surface portion formed to extend from the rear surface portion toward a front surface, and exposed outwardly, a non-metal member formed in a region formed by cut away a portion of the case and having a slot formation portion spaced apart from the side surface portion at a predetermined interval and a pair of sectioning portions extending from the slot formation portion and traversing the side surface portion to section the side surface portion into first to third members, and first to third antenna patterns
(Continued)

formed in the opaque region and electrically connected to the first to third members to form first and third antennas, respectively.

13 Claims, 12 Drawing Sheets

(51) Int. Cl.
*H01Q 9/40* (2006.01)
*H01Q 1/38* (2006.01)
*H01Q 7/00* (2006.01)
*H04B 1/38* (2015.01)
*H04M 1/02* (2006.01)
*H04B 5/00* (2006.01)
*H01Q 9/42* (2006.01)

(52) U.S. Cl.
CPC ............... *H01Q 21/28* (2013.01); *H04B 1/38* (2013.01); *H04B 5/0031* (2013.01); *H04M 1/026* (2013.01)

(56) References Cited

U.S. PATENT DOCUMENTS

| | | | |
|---|---|---|---|
| 2013/0076573 | A1 | 3/2013 | Rappoport et al. |
| 2013/0207854 | A1 | 8/2013 | Ryu |
| 2015/0181005 | A1 | 6/2015 | Yun |
| 2017/0117616 | A1 | 4/2017 | Chen et al. |

FOREIGN PATENT DOCUMENTS

| | | |
|---|---|---|
| EP | 2677600 A1 | 12/2013 |
| KR | 10-0794418 B1 | 1/2008 |

\* cited by examiner

MOBILE TERMINAL

CROSS-REFERENCE TO RELATED APPLICATIONS

This Application is a Continuation of co-pending U.S. patent application Ser. No. 15/244,963 filed on Aug. 23, 2016, which claims the priority benefit under 35 U.S.C. § 119(a) to Korean Patent Application Nos. 10-2016-0003901 filed on Jan. 12, 2016 and 10-2016-0003385 filed on Jan. 11, 2016, both filed in the Republic of Korea, all of which are hereby expressly incorporated by reference into the present application.

BACKGROUND OF THE INVENTION

1. Field of the Invention

The present disclosure relates to a mobile terminal having an antenna using a case as a radiator.

2. Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Recently, a technology of utilizing a portion of a case of a mobile terminal, as an antenna, has come into prominence. However, utilization of all adjacent portions of a case as antennas may degrade antenna performance due to electromagnetic wave interference between adjacent antennas.

In particular, the problem may become serious in a case in which a case of a mobile terminal is formed of a metal.

SUMMARY OF THE INVENTION

Therefore, the present disclosure has been made to solve the above-mentioned problems occurring in the prior art while advantages achieved by the prior art are maintained intact.

Another aspect of the detailed description is to provide a mobile terminal having antennas which are independently operated without interfering with each other even though the antennas are formed to be adjacent to each other.

Another aspect of the detailed description is to provide a mobile terminal having an antenna pattern formed on an upper surface of a front case.

To achieve these and other advantages and in accordance with the purpose of this specification, as embodied and broadly described herein, a mobile terminal including: a window including a transparent region and an opaque region surrounding the transparent region; a metal case provided below the window to accommodate the window, having a rear surface portion facing the window and a side surface portion formed to extend from the rear surface portion toward a front surface, and exposed outwardly; a non-metal member formed in a region formed by cut away a portion of the case and having a slot formation portion spaced apart from the side surface portion at a predetermined interval and a pair of sectioning portions extending from the slot formation portion and traversing the side surface portion to section the side surface portion into first to third members; and first to third antenna patterns formed in the opaque region and electrically connected to the first to third members to form first and third antennas, respectively, wherein the first to third antenna patterns are disposed on a lower surface of the window and have different antenna modes.

According to an aspect of the present disclosure, the slot formation portion may be disposed to be adjacent to an upper end portion of the terminal.

According to an aspect of the present disclosure, a through hole may be formed in an upper portion of the case, an NFC antenna may be provided within the through hole, and first and second horizontal slot formation portions may be formed at both end portions of the slot formation portion in a width direction of the terminal to face the through hole.

According to an aspect of the present disclosure, the first antenna may be formed on one side of an upper end of the case, the third antenna may be formed on the other side of the upper end of the case, and the second antenna may be formed between the first and third antennas and may be a loop antenna.

According to an aspect of the present disclosure, the first and third antennas may be either a slot antenna or a planar inverter F-type antenna (PIFA).

According to an aspect of the present disclosure, the first antenna may be the PIFA type antenna and include a first feeding part and a first grounding part connected to a main circuit board provided between the case and the window.

According to an aspect of the present disclosure, the first grounding part may be a point to which the first member and the main circuit board are connected.

According to an aspect of the present disclosure, the second antenna may include a second feeding part and a second grounding part connected to the main circuit board.

According to an aspect of the present disclosure, the third antenna may be a slot antenna and include a third feeding part connected to the main circuit board, and the third member may be spaced apart from a ground member at a predetermined interval to form a slot.

According to an aspect of the present disclosure, maximum radiation points of the first to third antennas may not overlap each other.

According to an aspect of the present disclosure, current based on the first and second antennas may be formed outwardly, and a strength of the current based on the first antenna may be gradually increased toward the second member from an end portion of the first member, a strength of the current based on the second antenna may be gradually decreased toward an end portion of the second member from the center of the second member, and a distribution of current based on the third antenna may be formed within a slot formed between the third member and a ground.

According to an aspect of the present disclosure, a matching module electrically connected to the main circuit board may be provided in at least one of the first to third members.

According to an aspect of the present disclosure, the first to third antenna patterns may be in contact with the first to third members by a contact in at least one point, respectively.

According to an aspect of the present disclosure, the contact may be configured as a C-clip.

According to an aspect of the present disclosure, the mobile terminal may further include: a front case supporting the window and provided between the case and the window, first to third recess portions having the first to third antenna patterns may be formed to be recessed inwardly from an outer surface of an upper portion of the front case, and the first to third antenna patterns may be provided in the first to third recess portions, respectively.

According to an aspect of the present disclosure, the first to third antenna patterns may be formed not to protrude than the front case.

According to an aspect of the present disclosure, the first to third antenna patterns may be a flexible printed circuit board (FPCB) or a stainless steel board.

According to an aspect of the present disclosure, when any one of the first to third antenna patterns is formed of a stainless steel board, the antenna pattern may be insert-molded together with the front case.

According to an aspect of the present disclosure, when any one of the first to third patterns is formed of an FPCB, the antenna pattern may be attached to a corresponding recess portion by a bonding member.

According to an aspect of the present disclosure, the first to third recess portions may be formed in a left upper portion and a right upper portion of the front case, the second recess portion may be formed between the first and third recess portions, first and third antenna patterns each formed of an FPCB may be provided in the first and third recess portions, respectively, and a second antenna pattern formed of a stainless steel board may be provided in the second recess portion.

The mobile terminal according to the embodiments of the present disclosure has the following advantages.

According to at least one of the embodiments of the present disclosure, an influence of the case formed of a metal on antenna performance may be suppressed.

Also, according to at least one of the embodiments of the present disclosure, mutually adjacent antennas may radiate independently.

Also, according to at least one of the embodiments of the present disclosure, since a Sima antenna is formed on an upper surface of the front case, the window may be attached to the front case by a bonding member.

In addition, according to at least one of the embodiments of the present disclosure, since the stainless steel board is manufactured through insert-molding, material cost may be reduced.

Additional coverage of applicability of the present invention will become apparent from the following description of the embodiments which is set forth hereinafter. However, various modifications and equivalents within the concept and scope of the present invention may be clearly understood by a person skilled in the art, and detailed descriptions and specific embodiments of the present invention should be understood as being merely illustrative.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE EMBODIMENTS

Figure 1A:
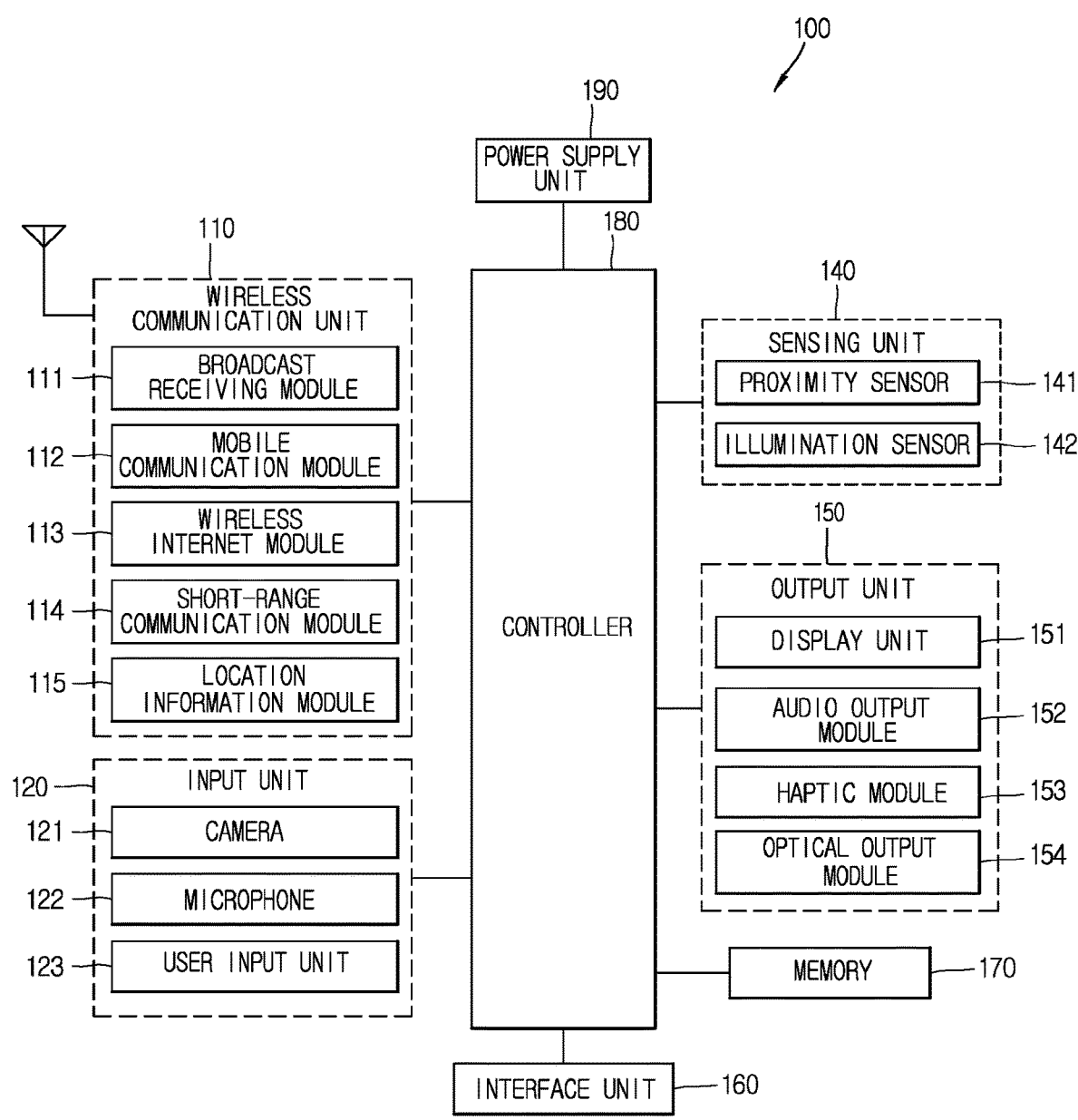
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
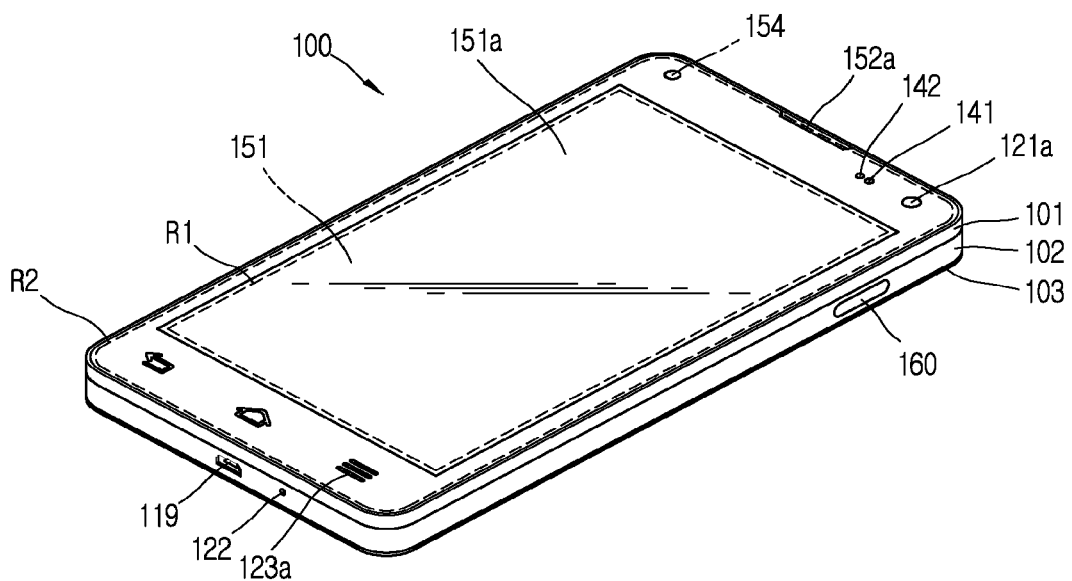
FIGS. 1B and 1C are conceptual views of one example of a general mobile terminal, viewed in different directions.
Figure 1C:
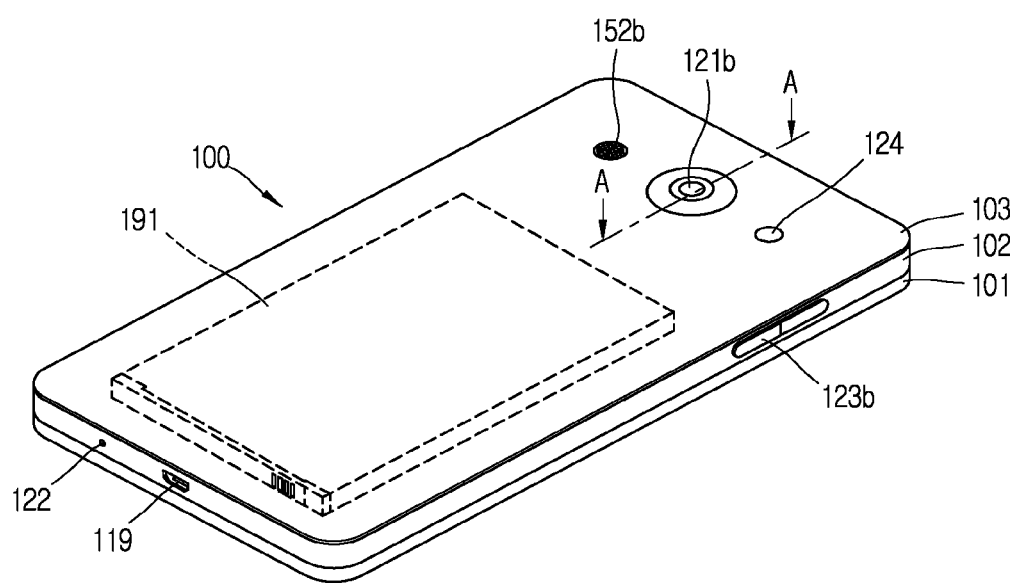

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a mobile terminal according to various embodiments to be explained later. The operation or the control method of the mobile terminal may be implemented on the mobile terminal by driving at least one application program stored in the memory 170.

Hereinafter, the aforementioned components will be explained in more detail with reference to FIG. 1A, before various embodiments are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to the mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or performs pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
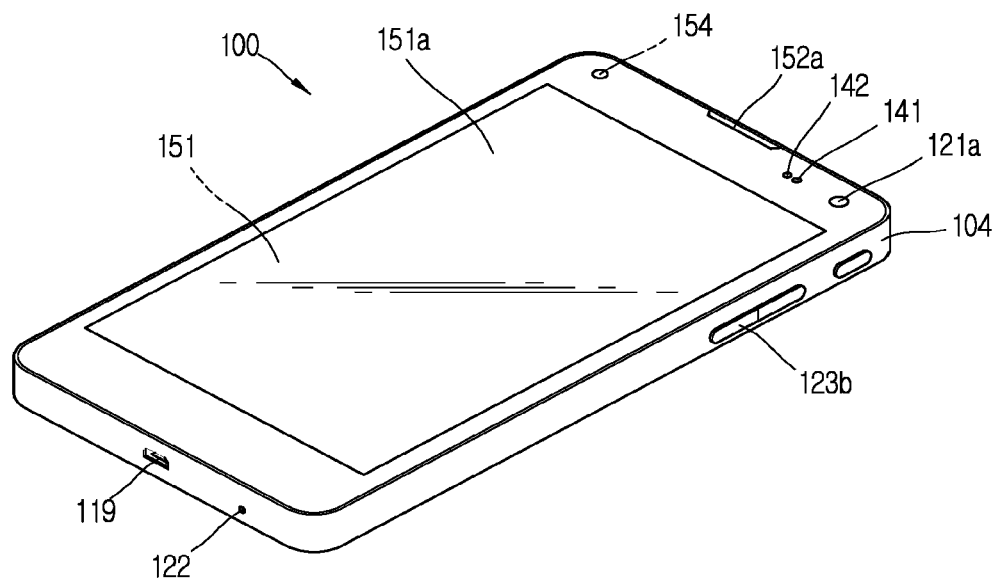
FIGS. 1D and 1E are conceptual views illustrating an example of a mobile terminal related to the present disclosure, viewed in different directions.
Figure 1E:
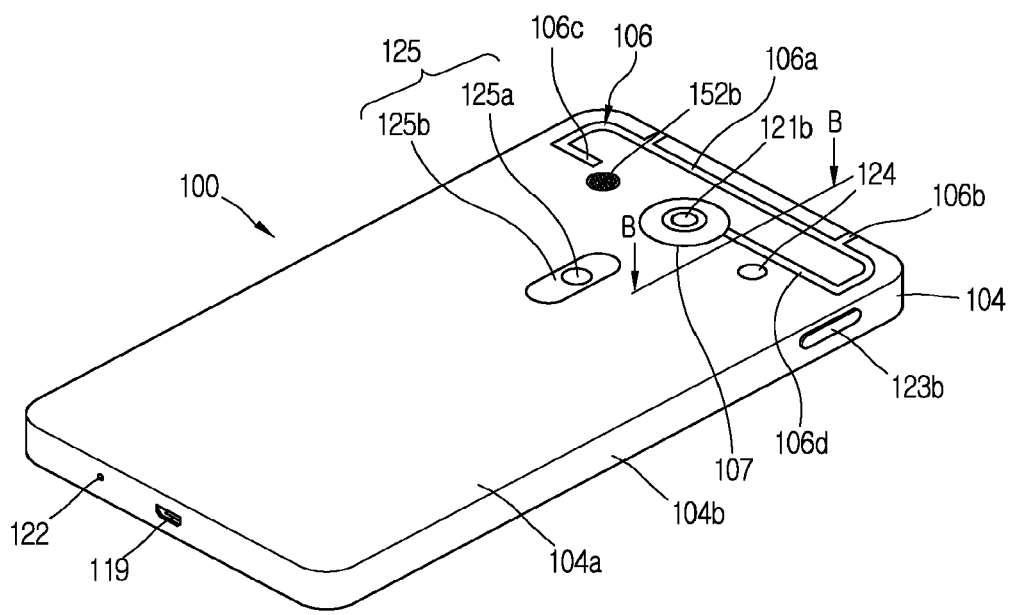
Figure 2:
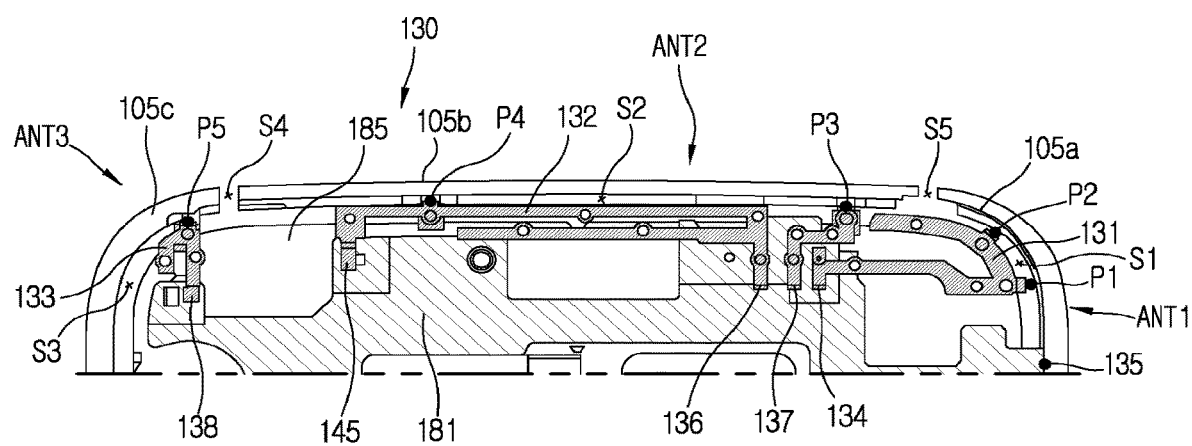
FIG. 2 is a view illustrating an antenna related to an embodiment of the present disclosure.

FIGS. 1D and 1E are conceptual views illustrating an example of the mobile terminal 100 related to the present disclosure, viewed in different directions, and FIG. 2 is a view illustrating an antenna related to an embodiment of the present disclosure, specifically, a front view without a window.

Hereinafter, the mobile terminal having an antenna related to an embodiment of the present disclosure will be described with reference to FIGS. 1D, 1E, and 2.

As illustrated in FIGS. 1D and 1E, in an embodiment of the present disclosure, it is illustrated that a case is formed as a uni-body. However, the present disclosure is not limited thereto and as illustrated in FIGS. 1B and 1C, an appearance of the mobile terminal 100 may be formed by the front case 101, the rear case 102, and the rear cover 103.

Hereinafter, the uni-body type terminal will be largely described.

A rear input unit 125 is formed on a rear surface of a terminal body. The rear input unit 125 includes a first button unit 125a exposed from the rear surface of the terminal body and performing a first function and a second button unit 125b disposed to be adjacent to the first button unit 125a and performing a second function. The first function may be a function related to ON/OFF of a power source or activation of the display unit 151, and the second function may be a function related to adjustment of a size of a sound output from the terminal body or a scroll function regarding output information of the display unit 151. Thus, the second button unit 125b may be disposed to be differentiated up and down or left and right, and the first button unit 125a is disposed between upper and lower portions or between left and right sides of the second button unit 125b or within the second button unit 125b.

An antenna (or an antenna device) 130 may be formed in an upper end or a lower end of the mobile terminal 100. Also, a plurality of antennas may be disposed in end portions of the terminal, and may transmit and receive wireless signals having different frequency bands.

Also, the mobile terminal 100 according to an embodiment of the present disclosure may include a middle frame 185 formed of a metal. The middle frame 185 may be formed of a metal to maintain sufficient rigidity even though it is formed to be thin. The middle frame 185 may operate as a ground. That is, a main circuit board 181 or the antenna 130 may be grounded to the middle frame 185, and the middle frame 185 may operate as a ground of the main circuit board 181 or the antenna device 130. In this case, the middle frame 185 may extend the ground of the mobile terminal 100. Thus, hereinafter, a ground may refer to one or more of the middle frame 185 or the main circuit board 181.

The main circuit board 181 may be electrically connected to antennas ANT1, ANT2, and ANT3, and process a wireless signal (or a wireless electromagnetic wave) transmitted or received by the antennas ANT1, ANT2, and ANT3. In order to process a wireless signal, a plurality of transceiver circuits may be formed or mounted on the main circuit board 181.

The transceiver circuits may include one or more integrated circuits and related electrical elements. For example, the transceiver circuits may include a transmission integrated circuit, a reception integrated circuit, a switching circuit, or an amplifier.

The plurality of transceiver circuits may simultaneously feed conductive members as radiators, whereby a plurality of antenna devices may simultaneously operate. For example, while any one of the plurality of transceivers transmits a wireless signal, another may receive a wireless signal, or the both may transmit or receive wireless signals.

The mobile terminal 100 according to an embodiment of the present disclosure includes a case 104 forming an appearance of the terminal body and a non-metal member 106 formed in a region of the case 104 to section the case 104. The non-metal member 106 is provided in a region formed by cutting away a portion of the case 104 formed of a metal. Here, the case 104 is sectioned by slits S4 and S5 and the sectioned portions are not electrically connected. That is, mutually adjacent regions sectioned by the non-metal member 106 are electrically separated.

The mobile terminal according to an embodiment of the present disclosure includes the case 104 forming an appearance of the terminal body. The case 104 is formed to cover one surface of the window 151a. The case 104 includes a rear surface portion 104a occupying the great part of the rear surface of the terminal body and a side surface portion 104b bent from the edge of the rear surface portion 104a toward a front side and formed to be substantially perpendicular to the rear surface portion 104a. The window 151a is accommodated in the case 104, the rear surface portion 104a opposes the window 151a, and an internal space is formed between the window 151a and the case 104. A plurality of components such as the main circuit board 181 may be formed in the internal space. The display unit 151 includes the window 151a and a display module 151b.

The rear surface portion 104a is formed to cover the rear surface of the terminal 100, excluding the rear input unit 125, the flash 124, the camera 121b, or the audio output unit 152b. Also, the side surface portion 104b connects the front side and the rear side of the mobile terminal, formed of a metal, and separated in region by the non-metal member 106. The side surface portion 104b includes an upper end surface positioned at an upper end of the mobile terminal, a lower end surface positioned at a lower end of the mobile terminal, and side end surfaces positioned at both side surfaces of the mobile terminal. In an embodiment of the present disclosure, the side surface portion 104b substantially refers to the upper end surface of the mobile terminal.

Meanwhile, referring to FIG. 1B, the window 151a includes a transparent region R1 displaying visual information toward the exterior and an opaque region R2 surrounding the transparent region R1. The opaque region R2 forms a bezel region. For example, a print layer may be formed on a lower surface of the opaque region R2, and visual information by the display module 151b may not be displayed outwardly due to the presence of the print layer in the opaque region R2.

Here, the non-metal member 106 is formed in a vicinity of an upper end surface of the side surface portion 104b. In detail, the non-metal member 106 is formed in a portion connecting the rear surface portion 104a and the side surface portion 104b, has a substantially "C" shape, and sections the upper end surface of the side surface portion 104b. To this end, in an embodiment of the present disclosure, the non-metal member 106 includes a slot formation portion 106a forming a slot extending from the side surface portion 104b or spaced apart from the side surface portion 104b at a predetermined interval, and a pair of sectioning portions 106b formed to traverse a portion of the side surface portion 104b, specifically, the upper end surface of the mobile terminal, to section the side surface portion 104b. First to third members 105a, 105b, and 105c may operate as antennas by means of the non-metal member 106, without being affected by the rear surface portion 104a.

The slot formation portion 106a may be disposed to be adjacent to an upper side end portion of the terminal 100 to have a shape corresponding to a shape of the upper side end portion of the terminal 100 and have a combination of a linear line and a curved line. The sectioning portions 106b extend from the slot formation portion 106a and traverse the side surface portion 104b to section the side surface portion 104b.

In this manner since the non-metal member 106 is filled in a state in which a predetermined region of the case 104 is cut away, electronic waves may be radiated to the outside.

Also, in an embodiment of the present disclosure, a plurality of antennas ANT1, ANT2, and ANT3 are provided in an upper portion of the mobile terminal 100. The plurality of antennas ANT1, ANT2, and ANT3 utilize a plurality of members 105a, 150b, and 150c formed by dividing the case 104, as radiators, respectively. That is, an upper end portion of the case 104 is divided into the plurality of members 105a, 105b, and 105c, by the non-metal member 106, and the plurality of divided members 105a, 105b, and 105c are utilized as portions of the first to third antennas ANT1, ANT2, and ANT3, respectively. The plurality of members 105a, 105b, and 105c function as radiators.

To this end, in an embodiment of the present disclosure, the non-metal member 106 divides the case 104 into the plurality of members. As illustrated in FIGS. 1E and 2, the non-metal member 106 is formed in a portion adjacent to the side surface portion 104b, and the first slit S4 and the second slit S5 are formed in the member formed in the upper end of the side surface portion 104b to allow the first to third antennas ANT1, ANT2, and ANT3 operate independently. That is, an upper end of the side surface portion 104b may be divided into three members 105a, 105b, and 105c, and the three members 105a, 105b, and 105c operate as radiators of the first to third antennas ANT1, ANT2, and ANT3. Here, the first to third members 105a, 105b, and 105c are spaced apart from a ground member to form the first to third slots S1, S2, and S3. The first to third slots S1, S2, and S3 correspond to the slot formation portion 106a. The first to third slots S1, S2, and S3 and the slot formation portion 106a are disposed to have different heights and overlap each other in at least a portion thereof.

The first to third slots S1, S2, and S3 are formed as the first to third members 105a, 105b, and 105c are spaced apart from the middle frame 185 or the circuit board 181 as a ground member, and a shape in which the first to third slots S1, S2, and S3 are connected corresponds to an end portion of the terminal 100. That is, the first to third slots S1, S2, and S3 are formed on an inner side of the terminal 100.

Figure 7A:
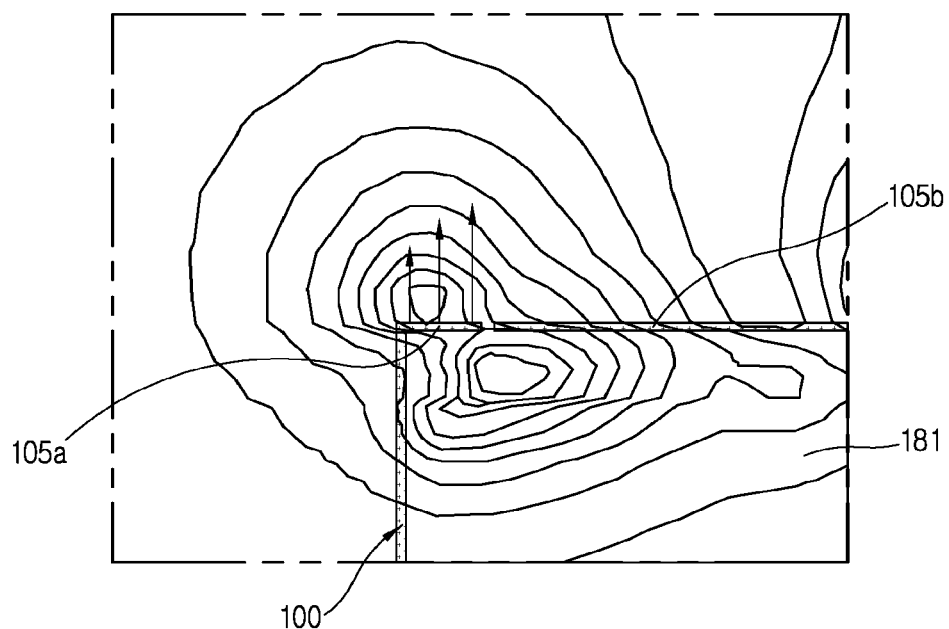
FIG. 7A is a view illustrating a distribution of an electric field in a first region according to an embodiment of the present disclosure.
Figure 7B:
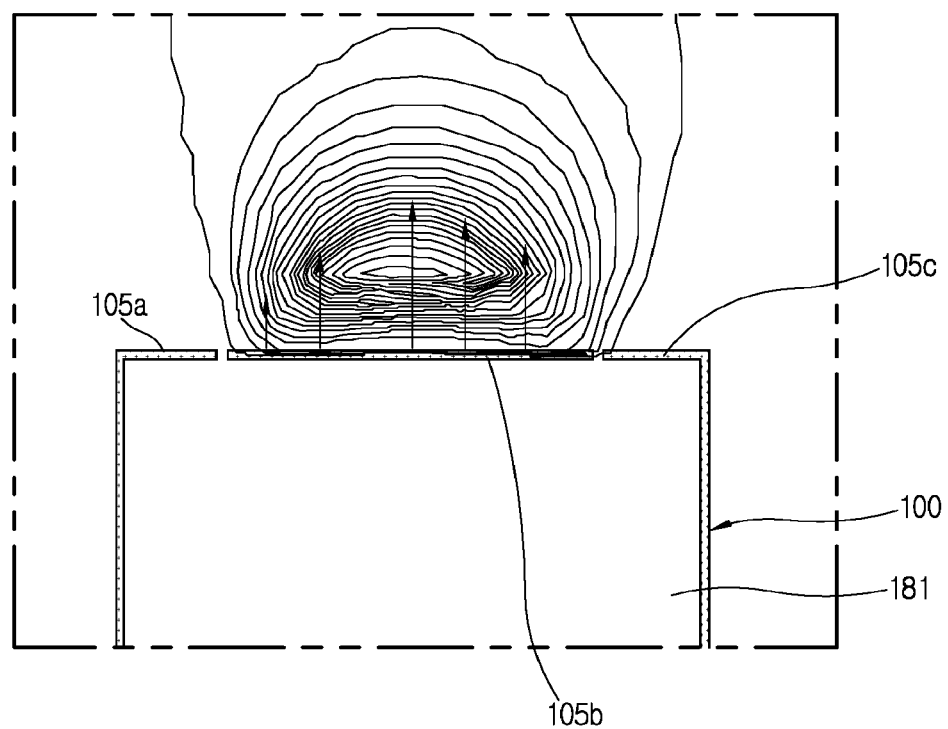
FIG. 7B is a view illustrating a distribution of an electric field in a second region according to an embodiment of the present disclosure.

FIG. 7A is a view illustrating a distribution of an electric field in the first region member 105a according to an embodiment of the present disclosure, and FIG. 7B is a view illustrating a distribution of an electric field in the second member 105b according to an embodiment of the present disclosure. Referring to FIGS. 7A and 7B, FIG. 7A illustrates a case in which the first member 105a is used as a PIFA type antenna, and FIG. 7B illustrates a case in which the second member 105b is used as a loop antenna.

As illustrated in FIG. 7A, in the PIFA type antenna of the first member 105a, strength of current in an edge is not great and is gradually increased toward a center from the edge and therefore towards the second member 105b. Also, as illustrated in FIG. 7B, in the loop antenna of the second member 105b, it is noted that a maximum current is generated at a middle point of the second member 105b and a strength of current is reduced toward both end portions of the second member 105b. In this manner, distributions and strength of current are different according to an antenna mode (or type), and in an embodiment of the present disclosure, a plurality of antennas are formed using a plurality of radiators disposed to be adjacent to each other using such properties.

Hereinafter, for the purposes of description, an antenna based on the first member 105a illustrated in FIG. 2 will be referred to as a first antenna ANT1, an antenna based on the second member 105b will be referred to as a second antenna ANT2, and an antenna based on the third member 105c will be referred to as a third antenna ANT3. FIG. 2 is a front view of the mobile terminal according to an embodiment of the present disclosure in which a window has been removed.

Figure 6A:
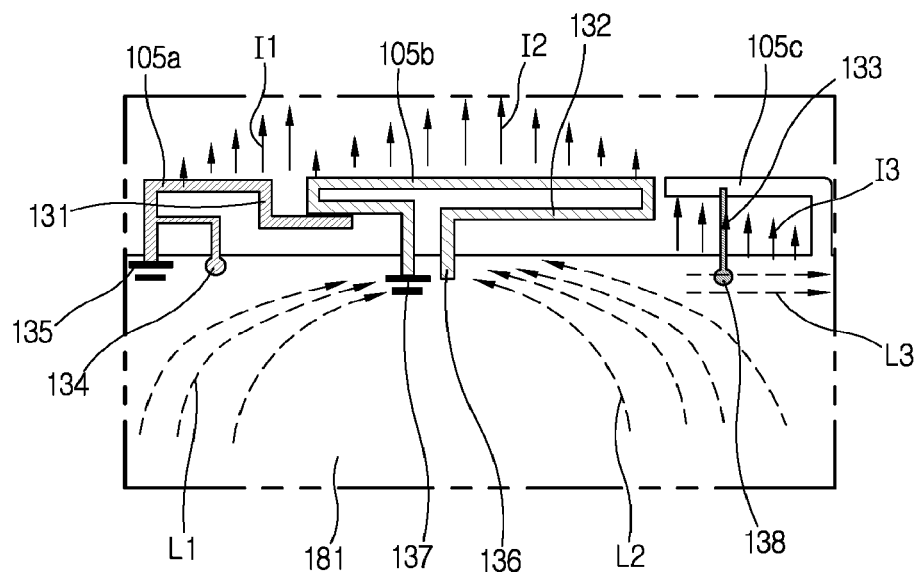
FIG. 6A is a view illustrating a current strength in a mobile terminal according to an embodiment of the present disclosure.
Figure 6B:
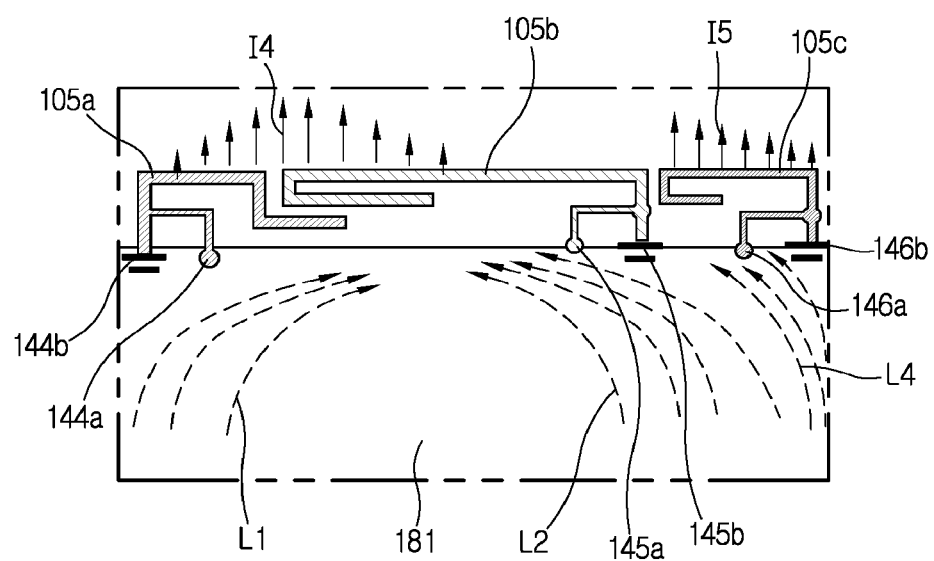
FIG. 6B is a view illustrating a current strength in a mobile terminal according to a comparative example.

Also, FIG. 6A illustrates a current distribution based on antennas according to an embodiment of the present disclosure and FIG. 6B illustrates a current distribution according to a comparative example. In FIG. 6B, it is illustrated that the first to third members 105a, 105b, and 105c are operated as the same antennas, for example, planar inverted F-type antennas (PIFAs).

In order to allow the first to third antennas ANT1, ANT2, and ANT3 to radiate electromagnetic waves independently without being interfered with each other, antenna modes of the first to third antennas ANT1, ANT2, and ANT3 are designed to be different in an embodiment of the present disclosure. For example, the first antenna ANT1 may be a PIFA, the second antenna ANT2 may be a loop antenna, and the third antenna ANT3 may be a slot antenna. This is disposed in consideration of current distributions of the first to third antennas ANT1, ANT2, and ANT3. That is, a loop antenna has characteristics in that a strength of current is reduced toward both ends with respect to a middle point of the radiator, and thus, in an embodiment of the present disclosure, the second antenna ANT2 disposed in the middle, among the first to third antennas ANT1, ANT2, and ANT3, is used as a loop antenna.

Also, a through hole 107 is formed in an upper portion of the case 104, through which a rear camera 121b is provided, and first and second horizontal slot formation portions 106c and 106d are formed at both end portions of the slot formation portion 106a and face the through hole 107.

In an embodiment of the present disclosure, the first antenna ANT1 may be a GPS or high band antenna. When the first antenna ANT1 operates as a high band antenna, the first antenna ANT1 may function as a multi-input multi-output (MIMO) antenna having a central frequency of 2.7 GHz. The first horizontal slot formation portion 106c affects a resonance frequency of the first antenna ANT1. For example, as a length of the first horizontal slot portion 106c is increased, a GPS resonance frequency of the first antenna ANT1 may be reduced.

Also, in an embodiment of the present disclosure, the second antenna ANT2 may be a low-band or mid-band antenna respectively having a central frequency of 700 to 960 MHz or 1850 to 2170 MHz. The third antenna ANT3 is a Wi-Fi antenna having a central frequency of 2.5 GHz or 5 GHz.

However, the ranges of the frequency band of the first to third antennas ANT1, ANT2, and ANT3 are not limited thereto.

Figure 4:
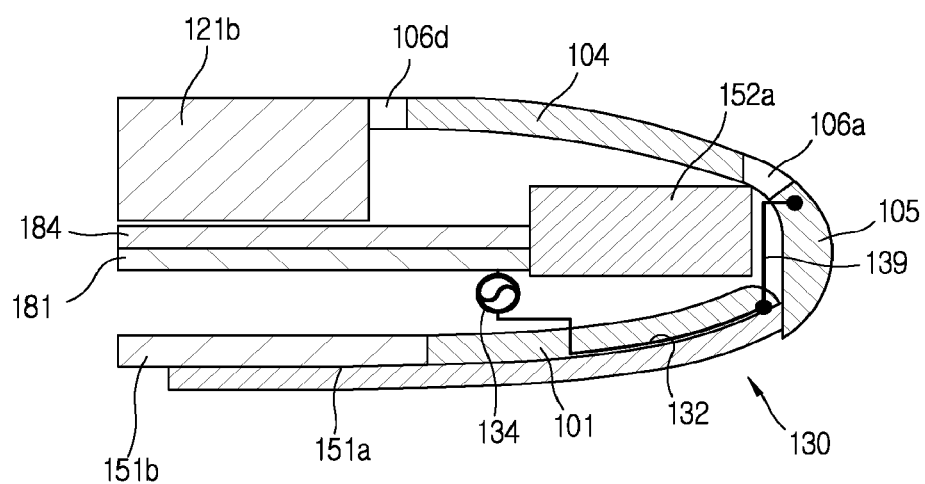
FIG. 4 is a cross-sectional view of a mobile terminal related to an embodiment of the present disclosure.
Figure 5:
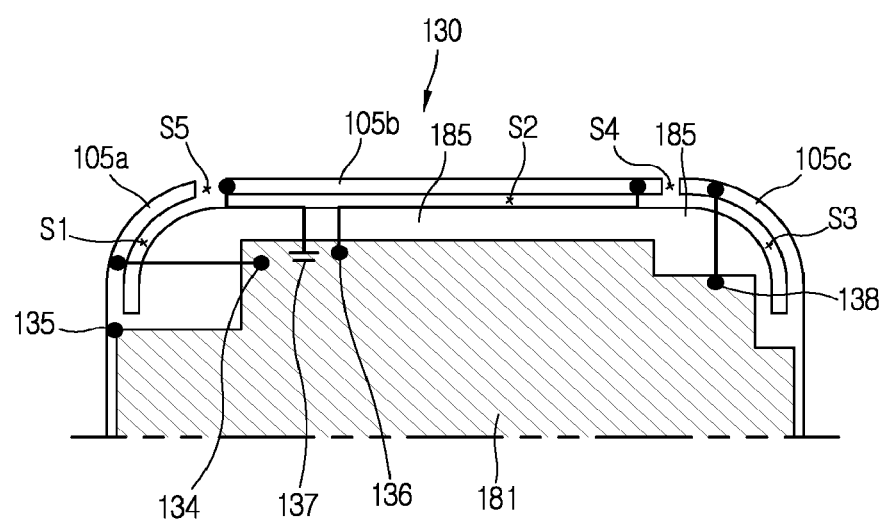
FIG. 5 is a view illustrating disposition of an antennas of a mobile terminal related to an embodiment of the present disclosure.

As illustrated in FIG. 4, an NFC antenna 184 is provided within the through hole 107 in which the rear camera 121b is provided. The NFC camera 184 may be formed on the main circuit board 181. When the rear surface portion 104a of the case 104 is formed of a metal, it may affect performance of the NFC antenna 184, and thus, in an embodiment of the present disclosure, the second horizontal slot formation portion 106d is formed in a width direction of the mobile terminal 100 in order to allow the NFC antenna 184 to radiate electromagnetic waves. The second horizontal slot formation portion 106d may extend to the through hole 107.

The PIFA antenna has characteristics that a strength of current in an edge field is small and increased toward an opening end portion. The slot antenna has characteristics in that a current is mainly distributed within a slot. Thus, in an embodiment of the present disclosure, the first antenna ANT1 and the third antenna ANT3 are disposed on both sides of the second antenna ANT2 to minimize interference of electromagnetic waves of the first to third antennas ANT1, ANT2, and ANT3. That is, the first to third antennas ANT1, ANT2, and ANT3 are disposed such that maximum radiation regions (or point) thereof do not overlap.

In general, in a slot antenna, a slot is formed on a wall surface of a waveguide, a surface of a cylindrical conductor, or a planar conducting plate, and the portion in which the slot is formed is fed to form an electric field within the slot, thus enabling the slot antenna to operate as a radiator of propagation.

A slot antenna with one side opened may resonate at a low frequency band with a short length of the slot according to a mirror effect, compared with a slot antenna with both sides closed. That is, the slot antenna with one side opened may resonate in the same frequency band by a length of about ½ of a length of the slot of the slot antenna with both sides closed.

In the case of the slot antenna with both sides closed, the slot has a length corresponding to ½ of a wavelength ($\lambda$) corresponding to a central frequency of a first frequency band, and in the slot antenna with one side opened, the slot has a length corresponding to ¼ of the wavelength ($\lambda$) of a central frequency. In other words, since the slot antenna with one side opened may radiate radio waves corresponding to a wireless signal of a low frequency band by the slot having a smaller length, a size thereof may be reduced.

Also, in the case of the PIFA antenna, a resonance frequency is generated when a length from a first grounding portion 135 as a contact of the antenna to an open end satisfies ¼, and thus, the antenna may be reduced in size by double, compared with the loop antenna. Also, in the case of the PIFA antenna, a point at which an electric field is maximized is the open end portion of the antenna.

In addition, a path of a surface current of the slot antenna on the ground is different from those of the first and second antennas ANT1 and ANT2. In detail, a current L1 on the ground based on the first and second antennas ANT1 and ANT2, that is, the PIFA antennas, and a current L2 on the ground based on the slot antenna are formed in a diagonal direction, while a current L3 on the ground based on the slot antenna is formed in a horizontal direction as illustrated in FIG. 6A, and thus, the paths of the currents on the ground rarely overlap.

Meanwhile, as illustrated in FIG. 6B, in a case in which all of the first to third members 105a, 105b, and 105c operate as PIFA antennas, strength of a current I4 based on the first and second members 105a and 105b is maximized between the first and second members 105a and 105b so radiation regions by the first and second members 105a and 105b overlap to degrade antenna performance. Also, referring to a distribution of a surface current on the ground, directions of surface currents L2 and L4 on the ground based on the second and third members 105b and 105c are similar to affect each other, degrading antenna performance. Here, a current I5 based on the third member 105c is similar to a current (please refer to I1 of FIG. 6A) in the first member 105a.

Referring back to FIG. 2, in the first antenna ANT1 of an embodiment of the present disclosure, a first feeding part 134 is electrically connected to the main circuit board 181 and a first grounding part 135 is formed at a point connected to the main circuit board 181. In detail, the first grounding part 135 is not formed by a terminal connecting the first member 105a and the main circuit board 181, but as the first member 105a is connected to the main circuit board 181, the first member 105a is grounded by itself.

Also, in the second antenna ANT2, a second feeding unit part 136 and a second grounding part 137 are electrically connected to the main circuit board 181, and in the third antenna ANT3, a third feeding part 138 is electrically connected to the main circuit board 181. In this manner, the first to third antennas ANT1, ANT2, and ANT3 are fed by the first to third feeding parts 134, 136, and 138. The third antenna ANT3 is formed to be spaced apart from the main circuit board 181 or the middle frame/ground member 185 by a predetermined interval to form the third slot S3, and operates as a slot antenna by the third feeding part 138. In the first and second antennas ANT1 and ANT2, the first and second members 105a and 105b are formed to be spaced apart from the ground member by a predetermined interval to form the first and second slots S1 and S2, and the first and second antennas ANT1 and ANT2 operate as a PIFA antenna and a loop antenna, respectively.

In the second antenna ANT2, a loop antenna, a conducting wire extending from the second feeding part 136 to the second grounding part 137 is ½ of a wavelength (λ) corresponding to an intermediate frequency of a second resonance frequency band, and a maximum point of an electric field is a middle point between the second feeding part 136 and the second grounding part 137.

Meanwhile, in an embodiment of the present disclosure, the rear surface portion 104a of the case 104 is formed to include a metal. Since the case 104 is formed of a metal, it may negatively affect performance of the first to third antennas ANT1, ANT2, and ANT3. In order to prevent this, in an embodiment of the present disclosure, an antenna pattern is formed in the window 151a of the display unit 151. This will be described hereinafter.

Figure 3:
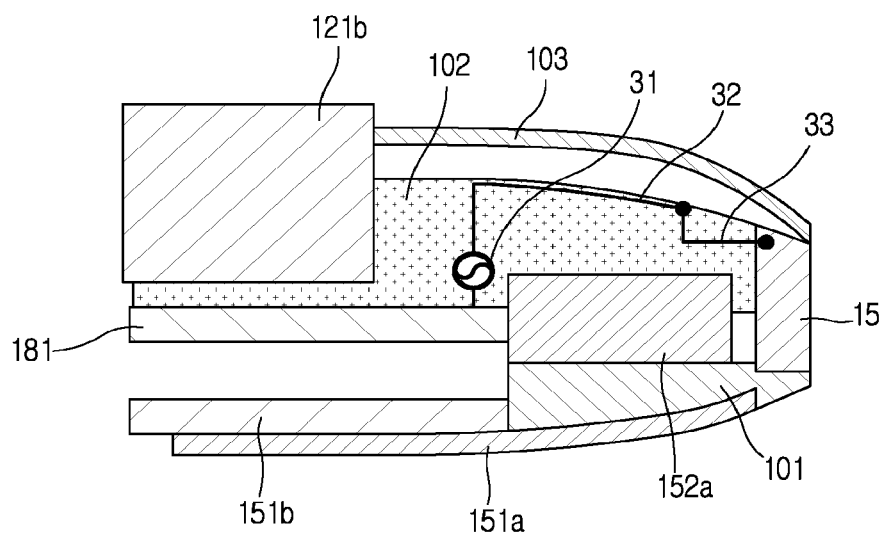
FIG. 3 is a cross-sectional view of a mobile terminal according to a comparative example.

FIG. 3 is a cross-sectional view of a mobile terminal according to a comparative example, taken along line A-A of FIG. 1C, and FIG. 4 is a cross-sectional view of a mobile terminal related to an embodiment of the present disclosure, taken along line B-B of FIG. 1E. An upper end surface 15 or 105 of the terminal body is formed of a metal. The upper end surface 15 or 105 is a surface exposed to an upper side of the side surface portion 104b, which may be termed a metal bezel. Also, the interior of the rear case 102 in FIG. 1C may be non-metal, but the upper end surface 15 exposed upwardly is a metal.

FIG. 3 is a view illustrating that an antenna pattern 32 fed by a feeding part 31 is formed on a surface of the rear case 102, and FIG. 4 is a view illustrating that a first antenna pattern 32 is formed on a lower surface of a window 151a. Here, the antenna pattern 32 is connected to the metal bezel 15 or 105 by a connection terminal 33.

In a case in which the antenna pattern 32 is formed to be adjacent to the rear cover 103 as illustrated in FIG. 3, if the rear cover 103 is formed of a metal, antenna performance is negatively affected.

Thus, in an embodiment of the present disclosure, in order to dispose the antenna pattern 32 such that it is spaced apart from the case 104 as much as possible, the antenna pattern 32 is formed on the front surface of the terminal body, specifically, on the lower surface (rear surface) of the window 151a.

Here, the first to third antennas ANT1, ANT2, and ANT3 do not necessarily have an antenna pattern, but hereinafter, it is assumed that the first to third antenna patterns ANT1, ANT2, and ANT3 have first to third antenna patterns 131, 132, and 133, respectively, formed in the opaque region.

Here, the first to third antenna patterns 131, 132, and 133 are electrically connected to the first to third first to third members 105a, 105b, and 105c to operate as radiators.

The first to third antenna patterns 131, 132, and 133 serve as a sort of feed delay line.

That is, a length of the first to third antenna patterns 131, 132, and 133 may be appropriately adjusted for tuning to enable the first to third antennas ANT1, ANT2, and ANT3 to effectively operate.

Also, in an embodiment of the present disclosure, a matching module 145 for impedance matching of the first to third antennas ANT1, ANT2, and ANT3 may be provided. The matching module 145 may be, for example, a variable switch.

Figure 8:
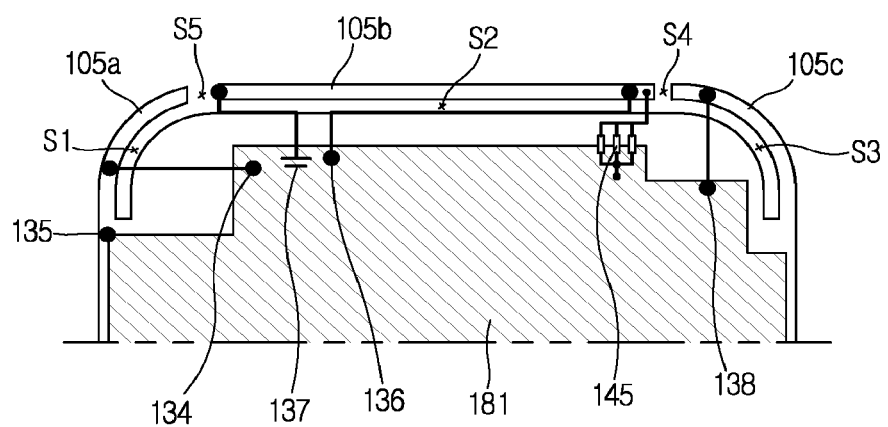
FIG. 8 is a view illustrating a matching module of an antenna of a mobile terminal according to an embodiment of the present disclosure.

FIG. 8 illustrates that the matching module 145 is provided in the antenna of the mobile terminal according to an embodiment of the present disclosure. As illustrated in FIGS. 2 and 8, the matching module 145 is formed in at least one of the first to third members 105a, 105b, and 150c and electrically connected to the main circuit board 181. The matching module 145 includes a lumped element, and may be configured as a combination of a series element or a shunt element The matching module 145 may include a series element implemented to include a capacitor or an inductor for impedance matching. The series element may adjust a reactance value, an imaginary part of impedance. For example, an inductor may increase reactance and a capacitor may decrease reactance, thus performing tuning for impedance matching. The series element may be implemented as a lumped element in any portion of the first to third antenna patterns 131, 132, and 133.

In detail, the matching module 145 may be configured as various combinations of a capacitor and an inductor. For example, the matching module 145 may have only inductors having different sizes, may have both an inductor and a capacitor, or may have only an inductor. Also, in the matching module 145, an inductor and a variable capacitor may be connected in series, only a variable capacitor may be provided, or an inductor and a variable capacitor may be connected in parallel.

The above examples are merely examples and a single pole double throw (SPDT) or a single pole triple throw (SP3T) may also be used as the matching module 145. Here, when an inductor is used, a resonance frequency may be lowered, and when a capacitor is used, a resonance frequency may be increased. The resonance frequency may be varied through an appropriate combination of the inductor and the capacitor. The variable switch 135 is obvious to a person skilled in the art to which the present invention pertains, and thus, a detailed description thereof will be omitted.

Here, as inductance is lower, a higher resonance frequency may be implemented. For example, in a case in which inductance is 3 to 4.6 nH, a resonance frequency of 869 to 895 MHz may be implemented. Meanwhile, as inductance is higher, a lower resonance frequency may be implemented. For example, when inductance is 15 to 20 nH, a resonance frequency of 746 to 780 MHz may be implemented.

Meanwhile, in a case in which a shut element or a series element is included in the antenna device, a more enhanced antenna device may be implemented by changing a length or a shape of a slot.

In an embodiment of the present disclosure, the first to third antenna patterns 131, 132, and 133 are in contact with the first to third members 105a, 105b, and 105c in at least one point, respectively. In this manner, since the first to third members 105a, 105b, and 105c are connected to the first to third antenna patterns 131, 132, and 133, respectively, a frequency band based on the first to third antenna patterns 131, 132, and 133 may be varied.

Referring to FIG. 2, in the first antenna ANT1, the first antenna pattern 131 is in contact with the first member 105a at first and second contacts P1 and P2, in the second antenna ANT2, the second antenna pattern 132 is in contact with the second member 105b at third and fourth contacts P3 and P4, and in the third antenna ANT3, the third antenna pattern 133 is in contact with the third member 105c at a fifth contact P5. The first to fifth contacts P1, P2, P3, P4, and P5 are contact terminals electrically connecting two points, which may be, for example, C-clips.

In this manner, since the first to third antenna patterns 131, 132, and 133 are brought into contact with the first to third members 105a, 105b, and 105c, respectively, a resonance length of the first to third antennas ANT1, ANT2, and ANT3 may be secured and multi-resonance may be implemented.

Meanwhile, in an embodiment of the present disclosure, a mobile terminal in which an antenna pattern is formed on an upper surface of a case may be provided. This will be described hereinafter.

For the purposes of description, the aforementioned part will be referred to as a first embodiment, and an embodiment described hereinafter will be referred to as a second embodiment. That is, the matters related to FIGS. 2 to 8 will be referred to as the first embodiment, and the matters related to FIGS. 9 to 14 will be referred to as the second embodiment. However, the first and second embodiments may be configured to cross each other.

Figure 1F:
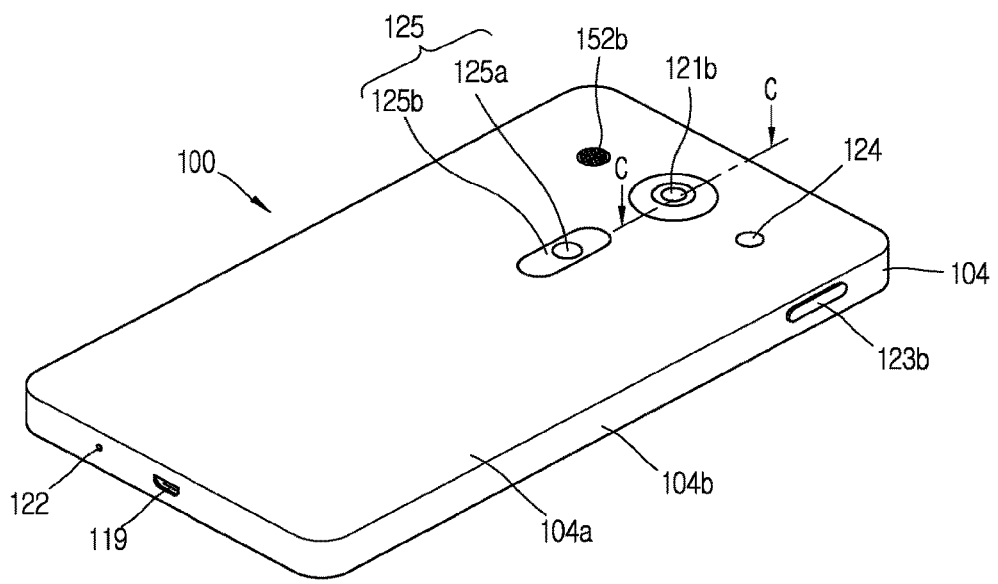
FIG. 1F is a conceptual rear view of an example of the mobile terminal 100 related to the present disclosure.
Figure 9:
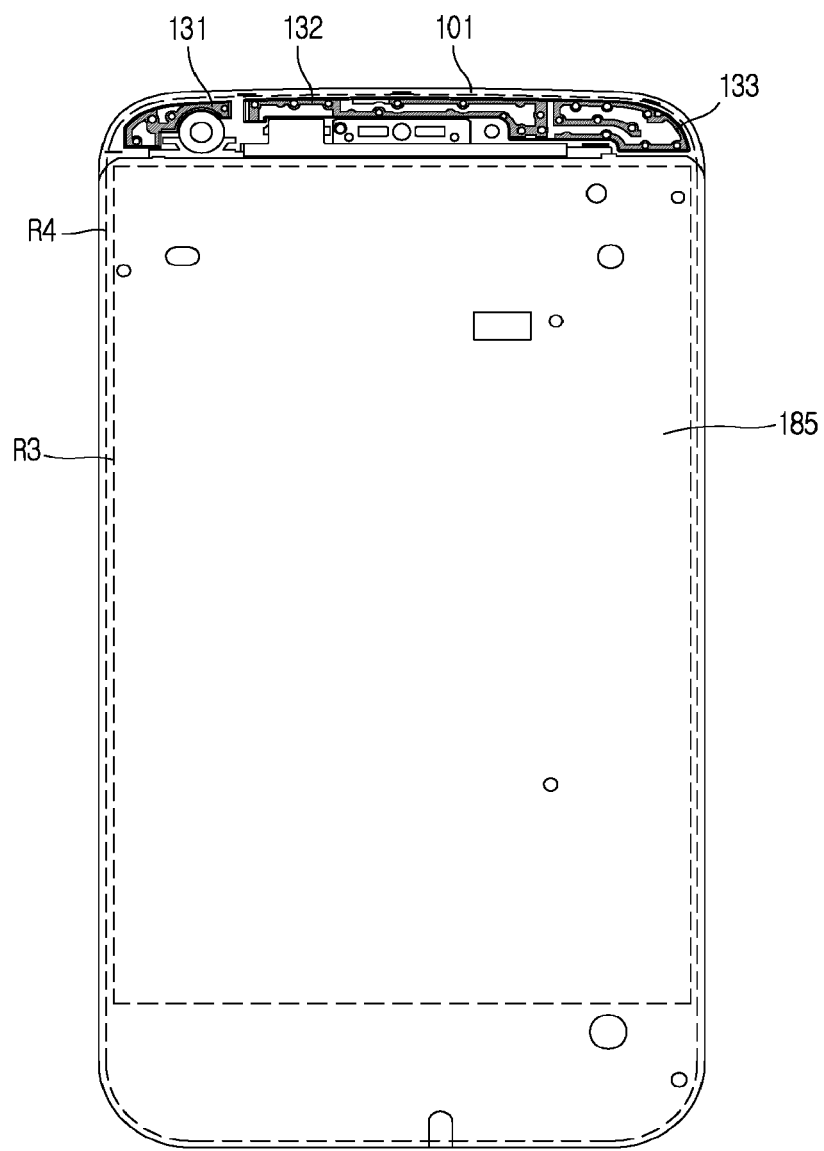
FIG. 9 is a view illustrating an antenna related to an embodiment of the present disclosure.

FIG. 1F is a conceptual rear view of an example of the mobile terminal 100 related to the present disclosure, and FIG. 9 is a view illustrating antennas related to an embodiment of the present disclosure, in which antenna patterns 131, 132, and 133 are formed in the front case 101.

Hereinafter, the mobile terminal 100 having the antenna patterns 131, 132, and 133 related to an embodiment of the present disclosure will be described with reference to FIGS. 1D, 1F, and 9.

As illustrated in FIGS. 1D and 1F, in an embodiment of the present disclosure, a case is formed as a uni-body. However, the present disclosure is not limited thereto and an appearance of the mobile terminal 100 may be formed by the front case 101, the rear case 102, and the rear cover 103.

Hereinafter, a uni-body type terminal will be largely described.

FIG. 1F is similar to FIG. 1E. That is, only the presence and absence of the non-metal member 106 is different and the other components are the same. Thus, descriptions of redundant parts as those described above with reference to FIG. 1E will be omitted. Thus, hereinafter, the components of FIG. 1E may also be applied to FIG. 1F, unless otherwise mentioned.

The main circuit board 181 is electrically connected to the antenna patterns 131, 132, and 133, and configured to process a transmitted or received wireless signal (or a wireless electromagnetic wave). In order to process a wireless signal, a plurality of transceiver circuits may be formed or installed in the main circuit board 181.

As illustrated in FIG. 9, the front case 101 having the window 151a includes regions R3 and R4 corresponding to the transparent region R1 and the opaque region R2 of the window 151a. In FIG. 9, a case in which the middle frame 185 is provided in the front case 101 is illustrated. Here, the front case 101 supports the window 151a and is provided between the case 104 and the window 151a.

Figure 14:
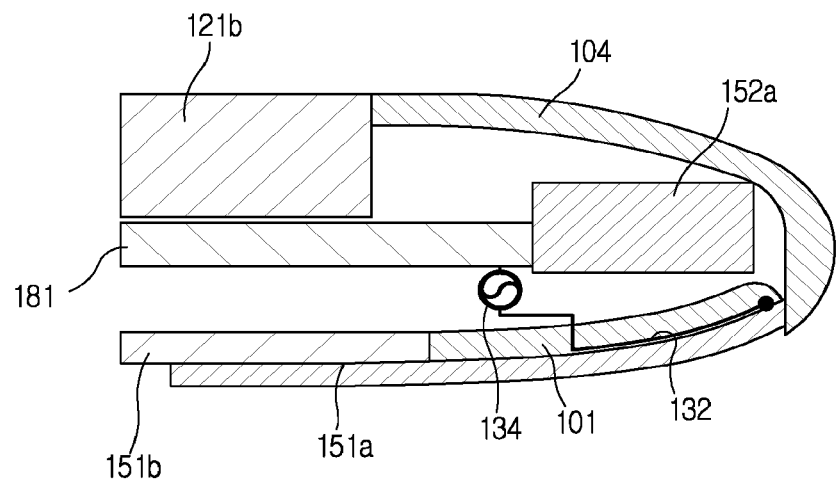
FIG. 14 is a cross-sectional view taken along line C-C of FIG. 1F.

FIG. 14 is a cross-sectional view of a mobile terminal related to an embodiment of the present disclosure, taken along line C-C of FIG. 1F. In an embodiment of the present disclosure, the cover 103 and case 104 covering the rear side of the terminal body are formed of a metal.

FIG. 3 illustrates that the antenna pattern 32 fed by the feeding part 31 is formed on a surface of the rear case 102, and FIG. 14 illustrates that the second antenna pattern 132 is formed on a lower surface of the window 151a. In a case in which the antenna pattern 32 is formed to be adjacent to the rear cover 103 as illustrated in FIG. 3, if the rear cover 103 is formed of a metal, antenna performance is negatively affected.

Thus, in the second embodiment of the present disclosure, as in the first embodiment, the antenna pattern 132 is formed on the front surface of the terminal body, specifically, on a lower surface (rear surface) of the window 151a, in order to dispose the antenna pattern 132 to be spaced apart from the case 104 formed of a metal as much as possible.

In a case in which the case 104 forming the rear side of the terminal 100 is formed of a metal, radiation of electromagnetic waves based on the antenna pattern is made through the front surface of the terminal 100 in an embodiment of the present disclosure in order to solve the disposition problem of the antenna pattern.

In detail, the mobile terminal according to the second embodiment of the present disclosure includes the front case 101 having the window 151a and the cases 103 and 104 formed of a metal exposed backwardly and covering the rear surface of the front case 101. The cases 103 and 104 are exposed outwardly, which may correspond to the rear cover 103 in FIGS. 1B and 1C and the case 104 in FIGS. 1D and 1F. Here, FIGS. 1D and 1F related to a uni-body type terminal.

Figure 10:
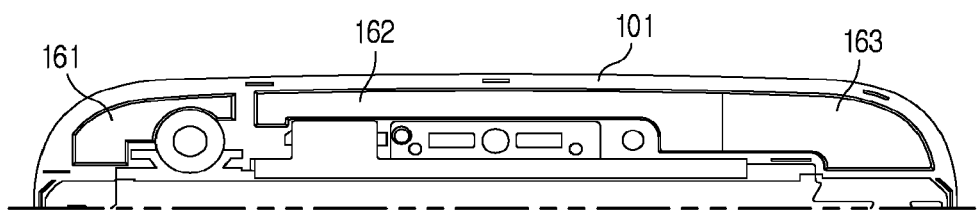
FIG. 10 is a view illustrating a configuration in which a recess portion is formed in a front case according to an embodiment of the present disclosure.
Figure 11:
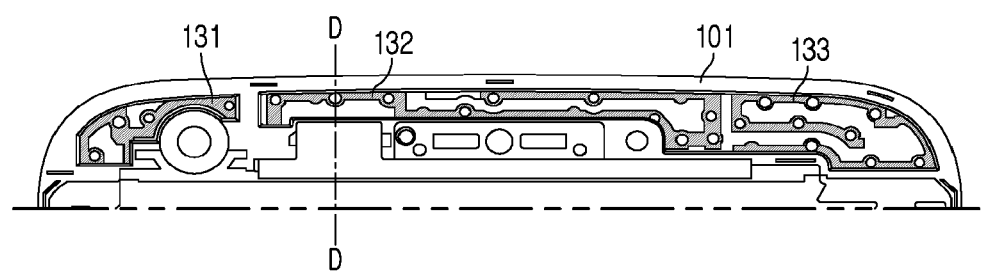
FIGS. 11 and 12 are views illustrating a configuration in which an antenna pattern is formed in the recess portion of FIG. 10.
Figure 12:
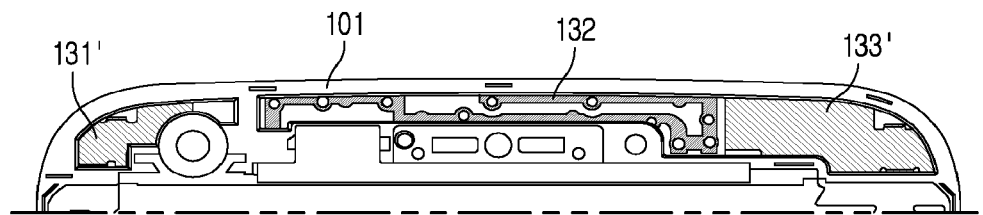

FIG. 10 is a view illustrating a configuration in which recess portions 161, 162, and 163 are formed in the front case 101, and FIGS. 11 and 12 are views illustrating a configuration in which antenna patterns 131, 132, 133, 131', and 133' are formed in the recess portions 161, 162, and 163. This will be described with reference to FIGS. 10 to 12.

One or more recess portions 161, 162, and 163 are formed on an upper surface of the front case 101 and recessed inwardly, and the antenna patterns 131, 132, 133, 131', and 133' radiating electromagnetic waves to the front surface are formed in the recess portions 161, 162, and 163. That is, since the antenna patterns 131, 132, 133, 131', and 133' are formed in the recess portions 161, 162, and 163, the antenna patterns 131, 132, 133, 131', and 133' do not protrude, compared with the front case 101. The recess portions 161, 162, and 163 have a groove shape.

Here, the recess portions 161, 162, and 163 are formed above the region R4 corresponding to the opaque region R2 of the window 151a. That is, since the antenna patterns 131, 132, 133, 131', and 133' are formed at an upper end of the mobile terminal, a region for the antenna patterns 131, 132, 133, 131', and 133' to be formed may be sufficiently secured.

The antenna patterns 131, 132, 133, 131', and 133' may be formed of a metal, and in an embodiment of the present disclosure, the antenna patterns 131, 132, 133, 131', and 133' may be formed of a flexible printed circuit board (FPCB) or a combination of the FPCB and a stainless steel board. That is, the antenna patterns 131, 132, 133, 131', and 133' may be formed of only a stainless steel board or a combination of a stainless steel board and an FPCB. When the antenna patterns 131, 132, and 133 are formed of a stainless steel board, the antenna patterns 131, 132, and 133 may be insert-molded together with the front case 101 so as to be formed, and when the antenna patterns 131' and 133' are formed of an FPCB, the antenna patterns 131' and 133' may be attached to the recess portions 161, 162, and 163 by a bonding member 151c.

Figure 13A:
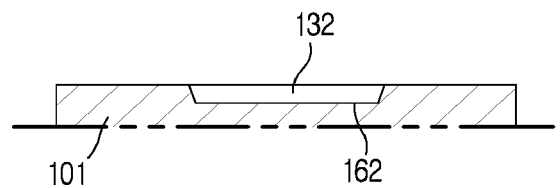
FIG. 13A is a cross-sectional view taken along line D-D of FIG. 11.
Figure 13B:
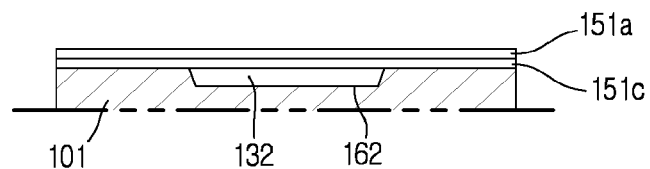
FIG. 13B is a cross-sectional view illustrating a configuration in which a window is attached by an adhesive member in the state of FIG. 13A.

FIG. 13A is a cross-sectional view taken along line D-D of FIG. 11 and FIG. 13B is a cross-sectional view illustrating a configuration in which the window 151a is attached by the bonding member 151c in the state of FIG. 13A. As illustrated in FIGS. 13A and 13B, the antenna pattern 132 is formed in the recess portions 161, 162, and 163, and the window 151a is stacked. Here, in order to attach the window 151a to the front case 101, the bonding member 151c is provided between the window 151a and the front case 101.

Meanwhile, in an embodiment of the present disclosure, the three recess portions 161, 162, and 163 are provided. That is, the first to third recess portions 161, 162, and 163 having the first to third antenna patterns 131, 132, 133, 131', and 133' are provided.

The first and third recess portions 161 and 163 are formed in a left upper portion and a right upper portion of the front case 101, respectively, and the second recess portion 162 is formed between the first and third recess portions 161 and 163.

FIG. 11 illustrates that the first and third antenna patterns 131 and 133 formed of an FPCB are provided in the first and third recess portions 161 and 163, respectively, and the second antenna pattern 132 formed of a stainless steel board is provided in the second recess portion 162.

FIG. 12 illustrates that first to third antenna patterns 131', 132, and 133' formed of a stainless steel board are provided in the first to third recess portions 161, 162, and 163, respectively.

FIGS. 11 and 12 are merely illustrative, and the use of a stainless steel board is advantageous in terms of material cost. However, in a case in which an antenna pattern is to be bent or formed in a narrow region but it is not easy to form the antenna pattern, an FPCB may be used. However, in general, in the case of using an FPCB as the antenna patterns 131' and 133', it is not easy to secure a bonding surface for bonding and an adhesive tape, so it is used only in a partial region, and the recess portion 162 having a large area may advantageously secure a region for forming the bonding member 151c.

However, in a case in which an FPCB is used as the antenna patterns 131' and 133', the FPCB may be delaminated, and thus, it may be difficult to re-use the FPCB. In an embodiment of the present disclosure, when the antenna patterns 131, 132, and 133 are formed of a stainless steel board, the antenna patterns 131, 132, and 133 may be, for example, a Sima antenna, single insert mold antenna. The Sima antenna is advantageous in case of forming the antenna patterns 131, 132, and 133 on a metal curved surface pressed by a technology advantageous for fine pattern design. Here, in an embodiment of the present disclosure, the front case 101 serves as a carrier, and the antenna patterns 131, 132, and 133 serves as radiators.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a window including:
   a transparent region; and
   an opaque region surrounding the transparent region;
   a metal case provided below the window to accommodate the window, the metal case comprising:
   a rear surface portion facing the window;
   a side surface portion formed to extend from the rear surface portion toward a front surface, and exposed outwardly;
   a non-metal member provided in a cut away portion of the case, the non-metal member having:
   a slot formation portion forming a slot extending from the side surface portion or spaced apart from the side surface portion at a predetermined interval;
   a pair of sectioning portions extending from the slot formation portion and traversing the side surface portion to section the side surface portion into first, second and third members to radiate electromagnetic waves independently; and first, second and third antenna patterns formed in the opaque region and electrically connected to the first, second and third members, respectively, to form first, second and third antennas, wherein the first, second and third antenna patterns are disposed on a lower surface of the window and have different antenna modes.

2. The mobile terminal of claim 1, wherein the slot formation portion is disposed to be adjacent to an upper end portion of the mobile terminal.

3. The mobile terminal of claim 2, wherein a through hole is provided in an upper portion of the case, wherein a Near Field Communication (NFC) antenna is provided within the through hole, and wherein first and second horizontal slot formation portions are formed at both end portions of the slot formation portion in a width direction of the mobile terminal to face the through hole.

4. The mobile terminal of claim 1, wherein the first antenna is formed on a first side of an upper end of the case, wherein the third antenna is formed on a second side, opposite to that of the first side, of the upper end of the case, wherein the second antenna is formed between the first antenna and the third antenna, and wherein the second antenna is a loop antenna.

5. The mobile terminal of claim 4, wherein the first antenna and the third antenna are either a slot antenna or a planar inverter F-type antenna (PIFA).

6. The mobile terminal of claim 5, wherein the first antenna is a PIFA and includes a first feeding part and a first grounding part connected to a main circuit board provided between the metal case and the window.

7. The mobile terminal of claim 6, wherein the first grounding part is located at a point where the first member and the main circuit board are connected.

8. The mobile terminal of claim 6, wherein the second antenna includes a second feeding part and a second grounding part connected to the main circuit board.

9. The mobile terminal of claim 8, wherein the third antenna is a slot antenna and includes a third feeding part connected to the main circuit board, and wherein the third antenna is spaced apart from a ground member at a predetermined interval to form a slot.

10. The mobile terminal of claim 4, wherein a matching module for impedance matching of the first, second and third antennas is electrically connected to a main circuit board and is provided in at least one of the first, second and third members.

11. The mobile terminal of claim 4, wherein the first, second and third antenna patterns are in contact with the first, second and third members by a contact in at least one point, respectively.

12. The mobile terminal of claim 1, further comprising:

a wireless communication unit operably coupled to the first and second antennas and operable to permit communications between the mobile terminal and a wireless communication system, communications between the mobile terminal and another mobile terminal, and communications between the mobile terminal and an external server.

13. The mobile terminal of claim 12, wherein the first and second antennas comprise a first member and a second member formed on the side surface portion, and wherein at least one of the first and second antennas include an antenna pattern formed in the opaque region and electrically connected to the at least one of the first and second antennas.

* * * * *